(12) United States Patent
Chan

(10) Patent No.: US 11,961,145 B2
(45) Date of Patent: Apr. 16, 2024

(54) METHOD FOR PREDICTING FINANCIAL PRODUCT PRICE BASED ON ACCUMULATION DISTRIBUTION INDICATOR

(71) Applicant: Sun Sun Chan, Hong Kong (CN)

(72) Inventor: Sun Sun Chan, Hong Kong (CN)

( * ) Notice: Subject to any disclaimer, the term of this patent is extended or adjusted under 35 U.S.C. 154(b) by 9 days.

(21) Appl. No.: 17/908,253

(22) PCT Filed: Jan. 14, 2022

(86) PCT No.: PCT/CN2022/071970
§ 371 (c)(1),
(2) Date: Aug. 31, 2022

(87) PCT Pub. No.: WO2022/247311
PCT Pub. Date: Dec. 1, 2022

(65) Prior Publication Data
US 2023/0230162 A1    Jul. 20, 2023

(30) Foreign Application Priority Data
May 26, 2021    (CN) .......................... 202110577506.9

(51) Int. Cl.
*G06Q 40/06*    (2012.01)
*G06Q 30/02*    (2023.01)
*G06Q 30/0201*    (2023.01)

(52) U.S. Cl.
CPC ......... *G06Q 40/06* (2013.01); *G06Q 30/0206* (2013.01)

(58) Field of Classification Search
CPC .......................... G06Q 40/06; G06Q 30/0206
(Continued)

(56) References Cited

U.S. PATENT DOCUMENTS

| 10,242,407 B1 * | 3/2019 | Hunt ...................... G06T 11/206 |
| 2006/0116943 A1 * | 6/2006 | Willain .................. G06Q 40/04 |
| | | 705/35 |

(Continued)

FOREIGN PATENT DOCUMENTS

| CN | 104732567 A | 6/2015 |
| CN | 107977755 A | 5/2018 |

(Continued)

*Primary Examiner* — Robert R Niquette
(74) *Attorney, Agent, or Firm* — Bayramoglu Law Offices LLC

(57) ABSTRACT

A method for predicting a financial product price based on an accumulation distribution indicator includes the following steps: step S1: inputting, by a user, a ticker symbol; step S2: calculating, by a system, an accumulation distribution indicator value based on daily trade data; step S3: calculating an accumulation distribution interval and an average candlestick; step S4: determining whether the accumulation distribution indicator breaks through the accumulation distribution interval upward or downward; if the accumulation distribution indicator breaks through the accumulation distribution interval upward or downward, going to step S6, otherwise, going to step S5; step S5: displaying a chart with the average candlestick; and step S6: displaying a breakout mark, where the breakout mark is a rising mark if an upward breakout occurs or is a falling mark if a downward breakout occurs, and displaying the chart with the average candlestick.

3 Claims, 2 Drawing Sheets

(58) Field of Classification Search
USPC .................................................... 705/35–45
See application file for complete search history.

(56) References Cited

U.S. PATENT DOCUMENTS

| | | |
|---|---|---|
| 2007/0168269 A1 | 7/2007 | Chuo |
| 2011/0178950 A1* | 7/2011 | Parga Landa .......... G06Q 40/04 |
| | | 705/36 R |
| 2013/0325747 A1* | 12/2013 | Lee ........................ G06Q 40/06 |
| | | 705/36 R |
| 2014/0258176 A1* | 9/2014 | Thorsen ................. G06Q 40/06 |
| | | 705/36 R |
| 2021/0383478 A1* | 12/2021 | Schneider ............... G06Q 40/06 |
| 2023/0130359 A1* | 4/2023 | Schneider ............... G06Q 40/04 |
| | | 705/37 |
| 2023/0196461 A1* | 6/2023 | Schneider .......... G06Q 30/0283 |
| | | 705/37 |

FOREIGN PATENT DOCUMENTS

| | | |
|---|---|---|
| CN | 112801789 A | 5/2021 |
| CN | 113256334 A | 8/2021 |

* cited by examiner

METHOD FOR PREDICTING FINANCIAL PRODUCT PRICE BASED ON ACCUMULATION DISTRIBUTION INDICATOR

CROSS REFERENCE TO THE RELATED APPLICATIONS

This application is the national phase entry of International Application No. PCT/CN2022/071970, filed on Jan. 14, 2022, which is based on and claims priority to Chinese patent application No. 202110577506.9, filed on May 26, 2021, the entire contents of which are incorporated herein by reference.

TECHNICAL FIELD

The present disclosure relates to a computerized trade price calculation method and, in particular, to a method for predicting a financial product price by specific means.

BACKGROUND

At present, for each financial product (such as foreign exchange, stock market, bonds, asset transactions, and mergers and acquisitions) and commodities (such as agricultural products and petroleum, hereinafter collectively referred to as commodity prices), many other activities and phenomena occur between market opening and closing and between a peak and a trough. Such activities and phenomena are very useful for monitoring overall market conditions. For example, useful intra-market information includes: a region in which the market is active, a quote corresponding to a largest volume, and a market reaction to a quote coming near a high price or a low price, which is acknowledged and widely used. Although traders and strategy-making analysts do not see the intra-market information from regular data and charts, the information is still widely used. Consequently, a current market usage is: an average price of closing prices of the market in a past period is used as a trade price of the market to conduct various commercial transactions.

The existing conventional pricing method using the average closing price of the commodity is obviously unable to provide complete information on the basic market conditions. An intermediate path of the price from the opening price to the closing price has been ignored. Conventionally, a trader who wants to acquire this type of intra-market information has to rely on tedious manual processes; for example, the trader observes price fluctuations on a quote screen, records the information into a log, and deduces such information by analyzing time spent on a price and volume distribution in a bar chart. Also, the trader records the time or volume (in a volume unit) of each trading price in a bar chart by creating a frequency distribution chart, so as to easily find information of a price range in which the trading is of a high level of activity, a low level of activity, or a major level of activity. In addition, various statistical parameters can be calculated based on such a distribution. However, it is very difficult for a user to record and analyze a large number of price changes, and there is no system developed with reference to market trading. Consequently, when trading, the user lacks a reference price for predicting price changes, which causes groundless decision-making.

SUMMARY

To solve the foregoing problem, a primary objective of the present disclosure is to provide a method for predicting a financial product price based on an accumulation distribution indicator. The method calculates the financial product price based on the accumulation distribution indicator and an accumulation distribution interval and provides a reference price for predicting price changes, so as to provide a relatively reliable basis for decision-making.

Another objective of the present disclosure is to provide a method for predicting a financial product price based on an accumulation distribution indicator. The method provides a flexible algorithm, achieves precise analysis results, and improves user experience.

To achieve the foregoing objectives, the technical solutions of the present disclosure are as follows:

A method for predicting a financial product price based on an accumulation distribution indicator is disclosed, including the following steps:

Step S1: Inputting, by a user, a ticker symbol.

Step S2: Calculating, by a system, an accumulation distribution indicator value based on daily trade data and calculating a 2-day moving average based on daily accumulation distribution indicator data.

Step S3: Calculating an accumulation distribution interval and an average candlestick, where the accumulation distribution interval is an interval between a medium-period regression line and a long-period regression line, and features of the accumulation distribution interval include a short-period line, a medium-period line, a medium-period regression line, a long-period regression line, a best-match period, and an average candlestick.

Step S4: Determining whether the accumulation distribution indicator breaks through the accumulation distribution interval upward or downward; if the accumulation distribution indicator breaks through the accumulation distribution interval upward or downward, going to step S6, or, if the accumulation distribution indicator does not break through the accumulation distribution interval upward or downward, going to step S5.

Step S5: Displaying a contrast chart with the average candlestick, determining whether a breakout mark exists, going to a next step if a breakout mark exists, or, returning to step S2 if no breakout mark exists.

Step S6: Displaying the breakout mark, where the breakout mark is a rising mark if an upward breakout occurs or is a falling mark if a downward breakout occurs, and displaying the chart with the average candlestick.

In step S2, a server traverses and calculates the accumulation distribution indicator data at a preset time point every day to extract features.

Furthermore, the features include indicators such as an opening price, a highest price, a lowest price, and a closing price.

In step S3, a server calculates the accumulation distribution interval in real time.

Beneficial effects of the present disclosure are as follows:

The present disclosure can calculate the accumulation distribution indicator and the accumulation distribution interval of a currently selected ticker symbol in real time based on the ticker symbol, make a contrast by use of the current price of a stock corresponding to the ticker symbol, the accumulation distribution indicator, and the accumulation distribution interval, and display the breakout mark. Based on the above features, the present disclosure not only provides a flexible algorithm and achieves precise analysis results, but also greatly improves user experience.

The present disclosure records price changes in a timely and detailed manner by using computer technology, and timely and accurately calculates the price at which the stock is mostly traded in the market in any period by use of big data. On the one hand, the technical solution of the present disclosure provides a true trade price of the market to both trading parties, and helps to enhance fairness, openness, and justness of the market. On the other hand, the technical solution of the present disclosure helps investors to better discover the trend of price changes and make investment decisions.

DETAILED DESCRIPTION OF THE EMBODIMENTS

To make the objectives, technical solutions, and advantages of the present disclosure clearer, the present disclosure is further described below in detail with reference to the drawings and embodiments. Understandably, the specific embodiments described herein are merely intended to explain the present disclosure but not to limit the present disclosure.

Figure 1:
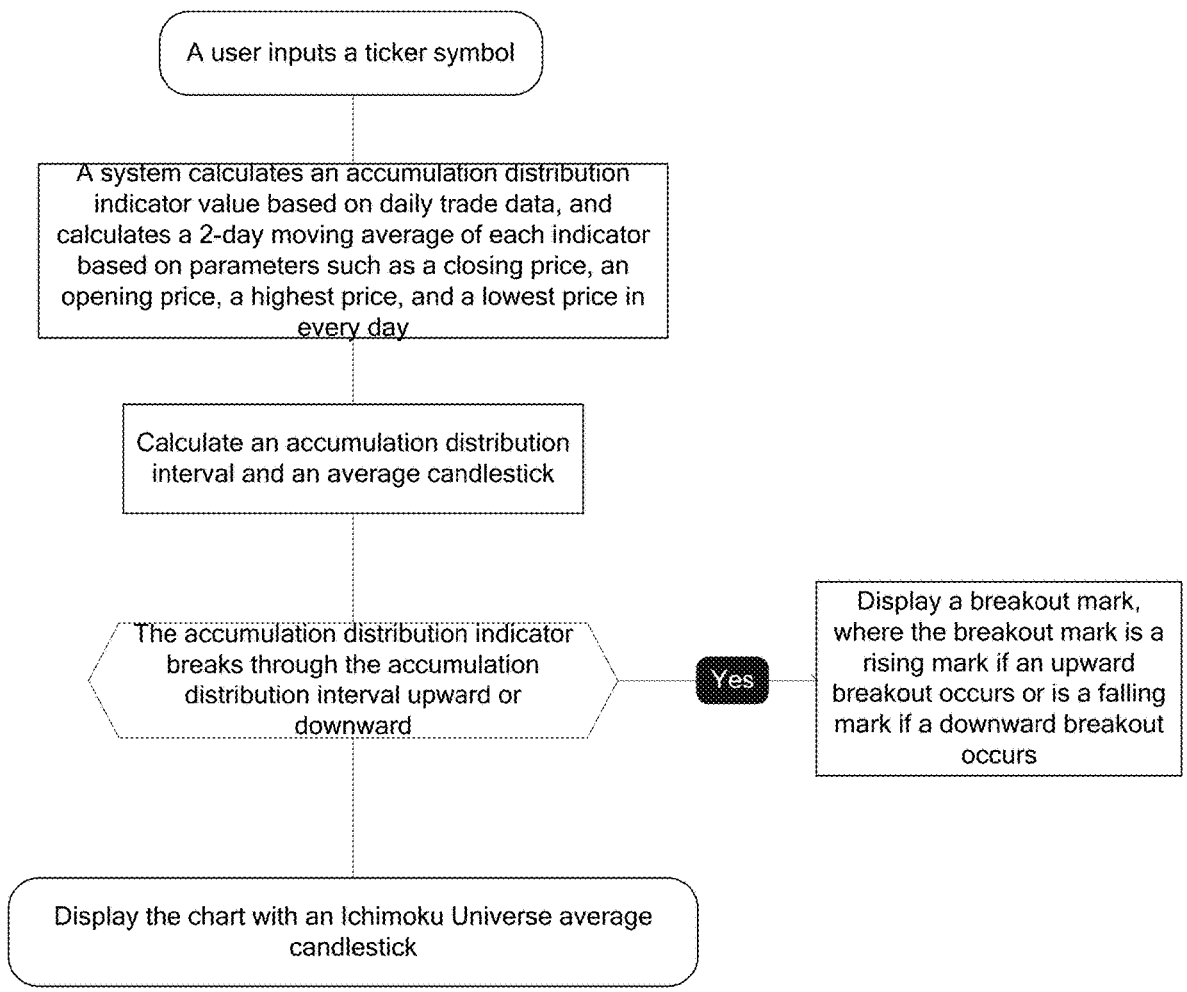
FIG. 1 is a flowchart of implementing the present disclosure.
Figure 2:
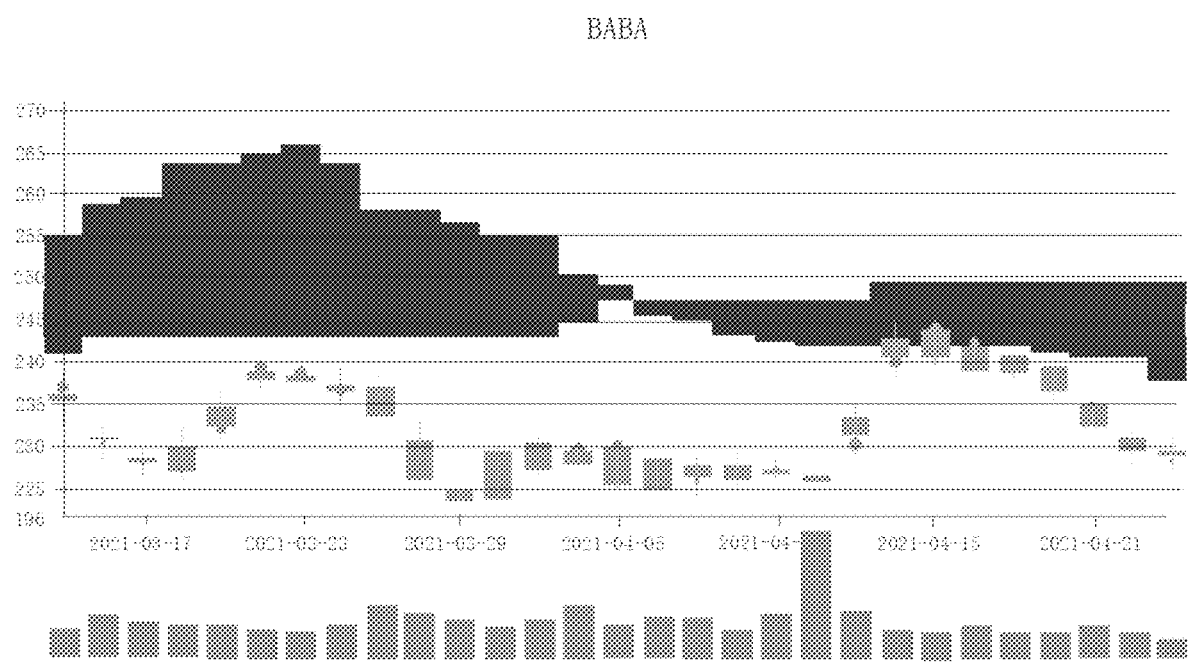
FIG. 2 shows an interface for displaying similar commodity prices according to the present disclosure.

As shown in FIG. 1, the present disclosure discloses a method for predicting prices of financial products (such as foreign exchange, stock market, bonds, asset transactions, and mergers and acquisitions) and commodities (such as agricultural products and petroleum) based on an accumulation distribution indicator. Referring to FIG. 1, the method includes the following steps:

Step S1: A user inputs a ticker symbol.

Step S2: A system calculates an accumulation distribution indicator value based on daily trade data, and calculates a 2-day moving average of each indicator based on daily indicators such as closing price, opening price, highest price, and lowest price.

The server traverses and calculates the accumulation distribution indicator data at a preset time point every day to extract features. The features include the highest price, the lowest price, and volume.

Step S3: Calculate an accumulation distribution interval and an average candlestick. The accumulation distribution interval is an interval between a medium-period regression line and a long-period regression line. An interval generated when the medium-period regression line is higher than the long-period regression line is marked in green, and an interval generated when the medium-period regression line is lower than the long-period regression line is marked in red. The calculation methods of a short-period line, a medium-period line, the medium-period regression line, and the long-period regression line are:

short-period line=(maximum value of the accumulation distribution indicator within 7 days+minimum value of the accumulation distribution indicator within 7 days)/2, where 7 days are a period (the length of the period is arbitrarily changeable as needed);

medium-period line=(maximum value of the accumulation distribution indicator within 22 days+minimum value of the accumulation distribution indicator within 22 days)/2, where 22 days are a period (the length of the period is arbitrarily changeable as needed);

medium-period regression line=(short-period line+medium-period line)/2, using the medium-period daily data as the current daily data; and long-period regression line=(maximum value of the accumulation distribution indicator within 44 days+minimum value of the accumulation distribution indicator within 44 days)/2, using the medium-period daily data as the current daily data. The length of the period of the long-period regression line is arbitrarily changeable as needed.

For the short-, medium- and long-periods, the values that best match the history data at each breakout position are selected as the period values by means of artificial intelligence (AI) big data analysis after the history trading data features of the ticker symbol are extracted based on the ticker symbol input by the user in step S1.

Average candlestick: a Yin or Yang candlestick formed by a 2-day average opening price, a 2-day average closing price, a 2-day average highest price, and a 2-day average lowest price (the length of the period is arbitrarily changeable as needed).

In this step, the server calculates the accumulation distribution interval in real time.

Step S4: Determine whether the accumulation distribution indicator breaks through the accumulation distribution interval upward or downward; if the accumulation distribution indicator breaks through the accumulation distribution interval upward or downward, going to step S6, or, if the accumulation distribution indicator does not break through the accumulation distribution interval upward or downward, going to step S5;

Step S5: Generate a new chart by superimposing the accumulation distribution interval and the accumulation distribution indicator on the average candlestick chart, where the new chart is called an Ichimoku Universe average candlestick.

Step S6: Display the breakout mark, where the breakout mark is a rising mark if an upward breakout occurs or is a falling mark if a downward breakout occurs, and displaying the chart with the Ichimoku Universe average candlestick.

The foregoing method can calculate the accumulation distribution indicator and the accumulation distribution interval of a currently selected ticker symbol in real time based on the ticker symbol, make a contrast by use of the current price of a stock corresponding to the ticker symbol, the accumulation distribution indicator, and the accumulation distribution interval, and display the breakout mark. Based on the above features, the present disclosure not only provides a flexible algorithm and achieves precise analysis results, but also greatly improves user experience.

The method for predicting prices of commercial products based on an accumulation distribution indicator, which is disclosed in the present disclosure, is applicable to various financial products (such as foreign exchange, stock market, bonds, asset transactions, and mergers and acquisitions) and commodities (such as agricultural products and petroleum). The principles lie in the price at which the largest volume is traded. Therefore, the price is a price at which the financial product or commodity is traded for the most time or the largest volume. The price is compared with three user-definable accumulation distribution indicators that are in a short period, a medium period, and a long period respectively, so that a reference price that best reflects the market is provided for the user to analyze and predict the price.

The present disclosure records price changes in a timely and detailed manner by using computer technology, and timely and accurately calculates the price at which the stock is mostly traded in the market in any period by use of big data. On the one hand, the technical solution of the present disclosure provides a true trade price of the market to both trading parties and helps to enhance fairness, openness, and justness of the market. On the other hand, the technical solution of the present disclosure helps investors to better discover the trend of price changes and make investment decisions.

The accumulation distribution indicator enhances the three principles of the financial product market: openness, fairness, and justness, as described below:

Openness: By virtue of the computer and AI functions, transactions are recorded, collected, and stored in detail. The price at which the financial product is traded for the largest volume within a specified period is calculated quickly and accurately. The accumulation distribution data can be disclosed publicly in time, thereby increasing market transparency exponentially.

Fairness: The accumulation distribution indicator is in the interests of, meets the needs of, and solves the concerns of all parties, and provides true, accurate, and accumulation-distribution-indexed trade prices required by buyers, sellers, and investors.

Justness: The impact caused by internal and external interference acts is mitigated and reduced by the accumulation distribution data for the benefit of investors, citizens, trading platforms, and the society.

What is described above is merely exemplary embodiments of the present disclosure, but not intended to limit the present disclosure. Any modifications, equivalent substitutions, improvements and the like made without departing from the spirit and principles of the present disclosure fall within the protection scope of the present disclosure.

What is claimed is:

1. A method for predicting a financial product price based on an accumulation distribution indicator, wherein the method comprises the following steps:
    step S1: inputting, by a user, a ticker symbol;
    step S2: calculating, by a system, an accumulation distribution indicator value based on daily trade data, and calculating a 2-day moving average based on daily accumulation distribution indicator data;
    step S3: calculating an accumulation distribution interval, in real time by artificial intelligence big data analysis performed by a server, and an average candlestick, wherein the accumulation distribution interval is an interval between a medium-period regression line and a long-period regression line and features of the accumulation distribution interval comprise a short-period line, a medium-period line, the medium-period regression line, the long-period regression line, a best-match period, the average candlestick and at least one trade price;
    step S4: determining whether the accumulation distribution indicator breaks through the accumulation distribution interval upward or downward; if the accumulation distribution indicator breaks through the accumulation distribution interval upward or downward, going to step S6, or, if the accumulation distribution indicator does not break through the accumulation distribution interval upward or downward, going to step S5;
    step S5: displaying a contrast chart with the average candlestick, determining whether a breakout mark exists, going to step S6 if a breakout mark exists, or, returning to step S2 if no breakout mark exists; and
    step S6: displaying the breakout mark, wherein the breakout mark is a rising mark if an upward breakout occurs, and the breakout mark is a falling mark if a downward breakout occurs; and displaying a chart with the average candlestick.

2. The method according to claim 1, wherein in step S2, a server traverses and calculates the accumulation distribution indicator data at a preset time point every day to extract the features.

3. The method according to claim 2, wherein the features further comprise indicators of an opening price, a highest price, a lowest price, and a closing price.

* * * * *